United States Patent
Tsuchiya (10) Patent No.: US 12,387,453 B2
(45) Date of Patent: Aug. 12, 2025

(54) INFORMATION PROCESSING DEVICE AND INFORMATION PROCESSING SYSTEM FOR MERCHANDISE REGISTRATION

(71) Applicant: TOSHIBA TEC KABUSHIKI KAISHA, Tokyo (JP)

(72) Inventor: Osamu Tsuchiya, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 238 days.

(21) Appl. No.: 17/990,232

(22) Filed: Nov. 18, 2022

(65) Prior Publication Data

US 2023/0237756 A1    Jul. 27, 2023

(30) Foreign Application Priority Data

Jan. 24, 2022    (JP) ................. 2022-008753

(51) Int. Cl.
*G06V 10/10*    (2022.01)
*G06Q 30/0601*    (2023.01)

(52) U.S. Cl.
CPC ......... *G06V 10/17* (2022.01); *G06Q 30/0601* (2013.01); *G06V 2201/07* (2022.01)

(58) Field of Classification Search
CPC .................... G06V 10/17; G06V 2201/07
See application file for complete search history.

(56) References Cited

U.S. PATENT DOCUMENTS

| | | |
|---|---|---|
| 9,754,169 B2 | 9/2017 | Nomura |
| 10,031,708 B2 | 7/2018 | Osaki |
| 2010/0185766 A1* | 7/2010 | Sano ............... G06F 1/3203 713/320 |
| 2017/0140362 A1 | 5/2017 | Yamaguchi |
| 2019/0197561 A1* | 6/2019 | Adato .............. G06T 7/73 |

FOREIGN PATENT DOCUMENTS

| | | | |
|---|---|---|---|
| JP | 2010165193 A | 7/2010 | |
| JP | 6409637 | * 10/2016 | ............ G07G 1/01 |
| JP | 2017162087 A | 9/2017 | |
| JP | 2018169766 A | 11/2018 | |
| WO | 2013089042 A1 | 6/2013 | |
| WO | WO2016136078 | * 1/2016 | ............ G07G 1/01 |

OTHER PUBLICATIONS

Japanese Office Action dated May 27, 2025, mailed in counterpart Japanese Application No. 2022-008753, 6 pages.

* cited by examiner

*Primary Examiner* — Myron Wyche
(74) *Attorney, Agent, or Firm* — Kim & Stewart LLP (57) ABSTRACT

An information processing device for a retail merchandise registration system includes a communication interface configured to connect to product scanners and processing requests and image data from the scanners. The processor compares a present device load value to a threshold and sends a positive response when the present device load is less than the threshold and a negative response when the present device load is equal to or greater than the threshold load. An image processing unit is configured to perform recognition processing on the image data from the scanner devices to detect an object depicted in the image data. The processor sends a recognition result to the scanner after the recognition processing has been performed by the image processing unit.

20 Claims, 6 Drawing Sheets

INFORMATION PROCESSING DEVICE AND INFORMATION PROCESSING SYSTEM FOR MERCHANDISE REGISTRATION

CROSS-REFERENCE TO RELATED APPLICATION

This application is based upon and claims the benefit of priority from Japanese Patent Application No. 2022-008753, filed Jan. 24, 2022, the entire contents of which are incorporated herein by reference.

FIELD

Embodiments described herein relate generally to an information processing device and an information processing system for merchandise registration and the like.

BACKGROUND

In the related art, a scanner device can be used in a retail store or the like to recognize a code symbol, such as a barcode, placed on an item of a merchandise that has been selected by a customer for purchase. Such a scanner device may take a picture (image) of the item to obtain a merchandise code corresponding to the code symbol from the image in order to register the item by merchandise code in a sales transaction. The scanner device may also recognize other information about the merchandise besides the code symbol from an image of the item.

For example, a sticker (a price reduction sticker) showing that the item is a target of a price reduction may be attached to the item. In this case, the price reduction sticker may be recognized from an image of the item obtained with the scanner device and the price reduction amount corresponding to the price reduction sticker can be applied to the item in the sales transaction. In some examples of the related art, the item type or classification may be recognized by generic objection recognition, deep learning models, or the like applied to an image of the item obtained by the scanner device.

The processing associated with recognition of a price reduction sticker tends to involve a higher system load than the processing associated with just recognizing a code symbol. Therefore, if a scanner device whose main task is to recognize a code symbol is used to execute other recognition processing (such as the recognition processing associated with the presence of a price reduction sticker), the processing load increases and this may hinder the code symbol recognition processing and this may result in a slower or delayed response in basic product scanning operations.

DETAILED DESCRIPTION

Certain embodiments described herein provide an information processing device and an information processing system that support recognition processing by a scanner device.

In general, according to one embodiment, an information processing device for retail merchandise registration systems or the like includes a communication interface to connect to a plurality of scanner devices and receive a processing request and image data from a scanner device in the plurality of scanner devices. A processor in the information processing device is configured to compare a present device load value to a threshold load value and send, via the communication interface, a positive response to the processing request when the present device load is less than the threshold load value or a negative response when the present device load is equal to or greater than the threshold load value. An image processing unit of the information processing device is configured to perform recognition processing on the image data from the scanner device to detect an object, such as a price reduction sticker or an item of merchandise being registered in a sales transaction, depicted in the image data. The processor is further configured to send a recognition result to the scanner device via the communication interface after the recognition processing is performed by the image processing unit.

Certain example embodiments of an information processing device and an information processing system will now be described with reference to the drawings. The example embodiments described below relate to a checkout system that may be introduced in a retail store such as a supermarket, but such examples and particular applications do not limit the possible configurations, specifications, and applications of other embodiments of the present disclosure.

Figure 1:
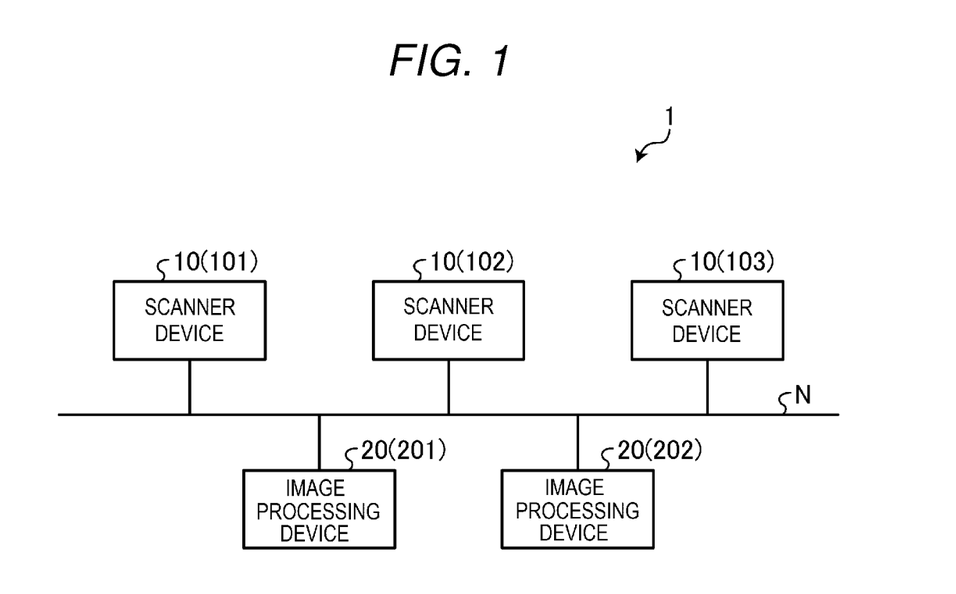
FIG. 1 shows an example of the configuration of a checkout system according to an embodiment.

FIG. 1 shows an example of the configuration of a checkout system 1 according to an embodiment. The checkout system 1 has at least one scanner device 10 and at least one image processing device 20.

The scanner devices 10 and the image processing devices 20 are connected to a network N via a wire or wirelessly. The network N is, for example, a LAN (local area network) or the like provided in the store.

While three scanner devices 10 (scanner device 101, a scanner device 102, and a scanner device 103) are illustrated in FIG. 1, the number of scanner devices 10 is not limited to this. Likewise, while two image processing devices 20 (an image processing device 201 and an image processing device 202) are illustrated in FIG. 1, the number of image processing devices 20 is not limited to this. In general, it is preferable to utilize a plurality of scanner devices 10 and a plurality of image processing devices 20.

A scanner device 10 picks up an image of an item of merchandise to be purchased by a customer and thus acquires image data of the item. The scanner device 10 then acquires information about the item from the image data. For example, the scanner device 10 recognizes a code symbol, such as a barcode attached to the item, from the image data and then decodes (or otherwise recognizes) a merchandise code, such as a JAN (Japanese Article Number) code, from the code symbol. In the following, the processing associated with the recognition ("reading") of a merchandise code from a code symbol in an image of an item of merchandise as executed by the scanner device 10 can be referred to as first recognition processing.

The scanner device 10 outputs the merchandise code that has been read to a merchandise sales data processing device such as a POS (point of sale) terminal. Based on a merchandise identifier or the like sent from the scanner device 10, the merchandise sales data processing device performs registration and ultimately payment processing for the item corresponding the merchandise identifier and thus executes data processing relating to the sales of merchandise.

The scanner device 10 may be integrated with the merchandise sales data processing device or may be connected to the merchandise sales data processing device via a wire or wirelessly. In the latter case, the merchandise sales data processing device may be connected to the network N. The scanner device 10 may be installed in a checkout area in the store or may be attached to a moving object such as a shopping cart.

The image processing device 20 is an example of the information processing device. The image processing device 20 receives image data transmitted from the scanner device 10 and performs processing to recognize information about an item of merchandise from the image data. Specifically, in the present example, the image processing device 20 attempts to recognize a price reduction sticker in the image data associated with an item of merchandise and then transmits information corresponding to the recognized price reduction sticker (e.g., a reduction of 50 yen or the like) to the scanner device 10. In the following, the processing associated with the recognition processing for a price reduction sticker or the like as executed by the image processing device 20 can be referred to as second recognition processing.

In this present embodiment, it is assumed that, of the two image processing devices 20, the image processing device 201 is set as a primary device and the image processing device 202 is set as a secondary device. It is also assumed that each of the scanner devices 10 has the address of the image processing device 201 stored as the destination for transmission of image data.

In the checkout system 1, an operator operating a scanner device 10 turns a code symbol attached to an item of merchandise toward an image pickup unit 16 and the scanner device 10 picks up (acquires) an image thereof. The scanner device 10 ultimately outputs a merchandise code read from image data along with information about any price reduction amount to the merchandise sales data processing device. The information regarding the price reduction amount may be acquired from an image processing device 20 after image data has been transmitted from the scanner device 10 to the image processing device 20.

When the merchandise code is sent to the merchandise sales data processing device, the merchandise sales data processing device specifies the corresponding merchandise name and listed price and executes registration processing on the item to be purchased. If price reduction information is sent along with the merchandise code, the merchandise sales data processing device registers the merchandise name of and the listed price minus the amount of price reduction. In general, the merchandise sales data processing device identifies the merchandise item corresponding to the provided merchandise code based on a merchandise master database that includes the merchandise code of each type of merchandise to be sold at the store in association with merchandise information such as the merchandise name and price (listed price) of the merchandise.

Upon receiving an instruction to end the registration process, the merchandise sales data processing device executes payment processing (transaction settlement processing) for the registered items.

Figure 2:
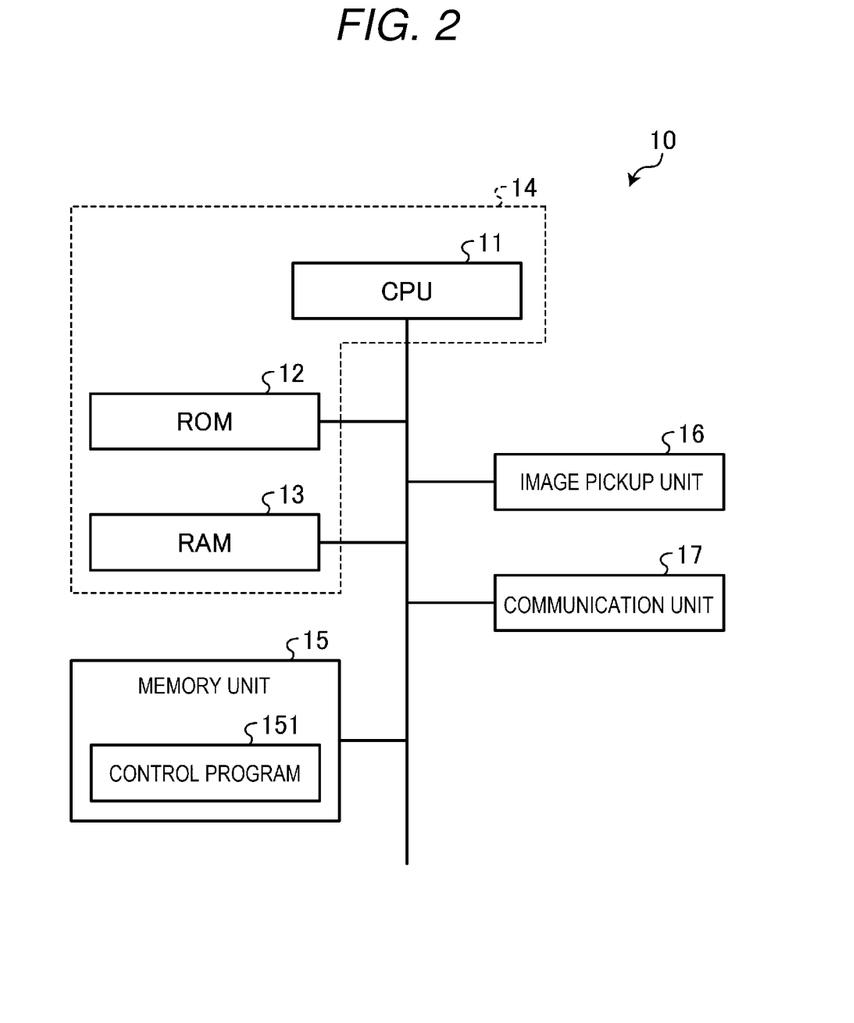
FIG. 2 shows an example of the hardware configuration of a scanner device.

FIG. 2 shows an example of the hardware configuration of a scanner device 10. As shown in FIG. 2, scanner device 10 has a CPU (central processing unit) 11, a ROM (read-only memory) 12, and a RAM (random-access memory) 13.

The CPU 11 manages and controls operations of the scanner device 10. The ROM 12 stores various programs. The RAM 13 is a work space where programs and various data can be loaded. The CPU 11, the ROM 12, and the RAM 13 are connected to each other via a bus or the like and form a control unit 14. In the control unit 14, the CPU 11 operates according to a control program 151 stored in the ROM 12 or a memory unit 15 and loaded in the RAM 13 and thus executes various kinds of processing.

The CPU 11 is also connected to the memory unit 15, the image pickup unit 16, and a communication unit 17 via a bus or the like.

The memory unit 15 is a memory device such as an HDD (hard disk drive), an SSD (solid-state drive) or a flash memory, and holds stored content even if the power is turned off. The memory unit 15 in this example stores the control program 151 and various kinds of setting information.

The image pickup unit 16 is an electronic camera having an image sensor such as a CCD (charge-coupled device) or a CMOS (complementary MOS). The image pickup unit 16, under the control of the CPU 11, acquires an image of an object such as an item of merchandise, thus generates image data. The image pickup unit 16 outputs the generated image data to control unit 14.

The communication unit 17 is a communication interface connectable to the network N. The communication unit 17 communicates with the image processing device(s) 20 via the network N.

Figure 3:
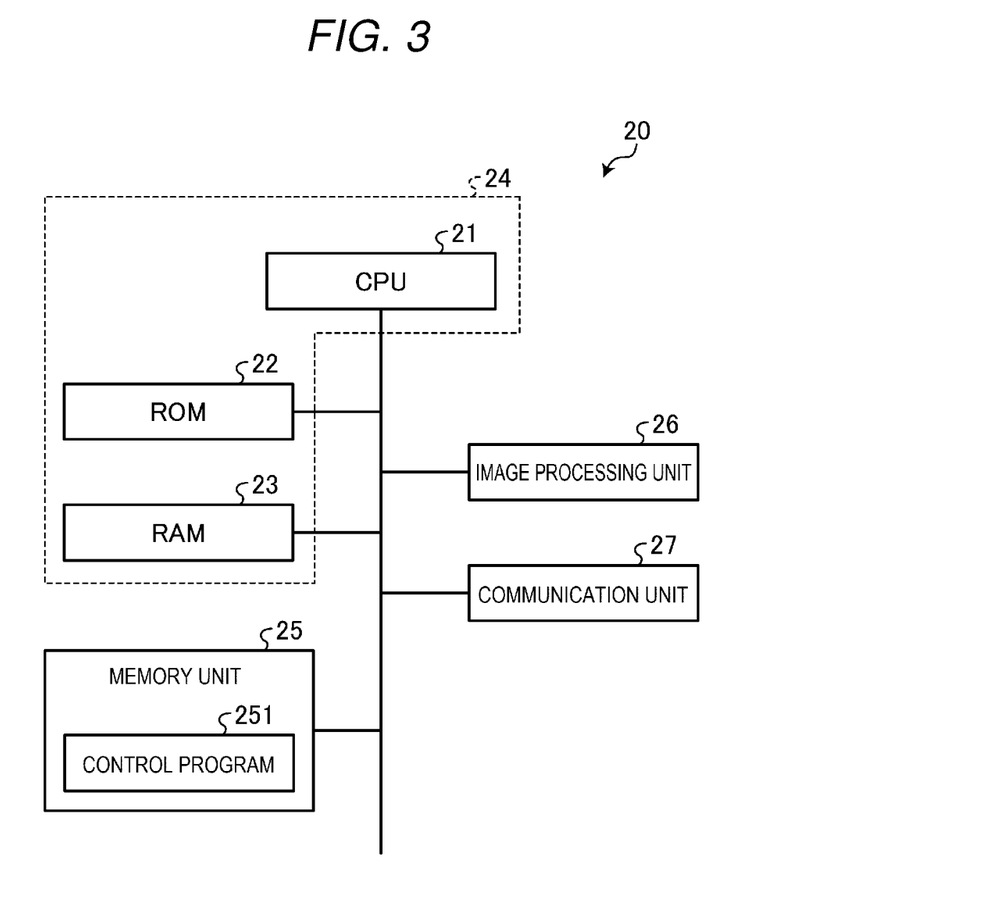
FIG. 3 shows an example of the hardware configuration of an image processing device.

FIG. 3 shows an example of the hardware configuration of the image processing device 20. As shown in FIG. 3, the image processing device 20 has a CPU 21, a ROM 22, and a RAM 23.

The CPU 21 controls operations of the image processing device 20. The ROM 22 stores various programs. The RAM 23 is a work space where programs and various data are loaded. The CPU 21, the ROM 22, and the RAM 23 are connected to each other via a bus or the like and form a control unit 24. In the control unit 24, the CPU 21 operates according to a control program 251 stored in the ROM 22 or a memory unit 25 and loaded in the RAM 23 and thus executes various kinds of processing.

The CPU 21 is also connected to the memory unit 25, an image processing unit 26, and a communication unit 27 via a bus or the like.

The memory unit 25 is a memory device such as an HDD, an SSD or a flash memory, and holds the stored content even if the power is turned off. The memory unit 25 in this example stores the control program 251 and various kinds of setting information.

The image processing unit 26 is a computing circuit specialized for image processing. For example, the image processing unit 26 is implemented as a GPU (graphics processing unit) or the like. The image processing unit 26, under the control of the CPU 21, executes processing for analyzing image data and extracting information such as a price reduction sticker or feature data from the image data. In this context, feature data refers to aspects related to object recognition or the like. In some examples, the image processing unit 26 may be implemented as a function of the CPU 21 rather than a separate circuit/component. That is, image processing unit 26 may be integrated with the CPU 21.

The communication unit 27 is a communication interface connectable to the network N. The communication unit 27 communicates with the scanner device(s) 10 and the other image processing device(s) 20 via the network N.

Figure 4:
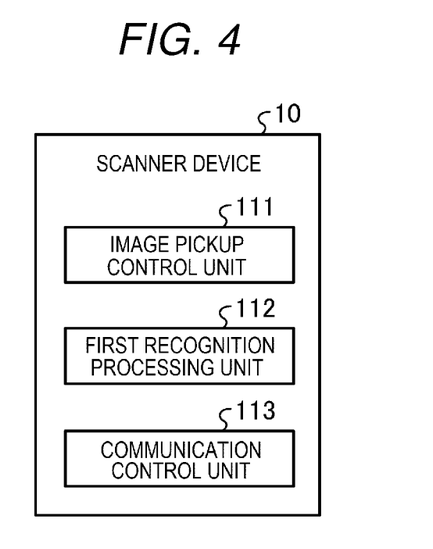
FIG. 4 depicts a functional configuration of a scanner device.

FIG. 4 shows an example of a functional configuration of the scanner device 10. As shown in FIG. 4, the scanner device 10 provides the functions of an image pickup control unit 111, a first recognition processing unit 112, and a communication control unit 113.

These described functional units of the scanner device 10 may be implemented as a software configuration of the CPU 11 (or the like) by execution of the control program 151 (or the like). In some examples, these described functional units may be implemented, in whole or in part, as a hardware configuration such as a dedicated circuit or the like installed in the scanner device 10.

The image pickup control unit 111 controls an operation relating to the image pickup (image acquisition) by the image pickup unit 16. Specifically, the image pickup control unit 111 causes the image pickup unit 16 to operate under a predetermined image pickup condition and acquires the image data from the image pickup unit 16. For example, the image pickup control unit 111 causes the image pickup unit 16 to operate at a frame rate of 30 fps (frames per second) or the like and may acquire a dynamic image (video) as image data.

The first recognition processing unit 112 executes first recognition processing on the image data picked up by the image pickup unit 16. Specifically, the first recognition processing unit 112 recognizes a code symbol on merchandise in the image data acquired by the image pickup control unit 111. The first recognition processing unit 112 also decodes the recognized code symbol, thus acquires a merchandise code encoded in the code symbol, and outputs the acquired merchandise code to the merchandise sales data processing device or the like.

The information to be recognized in the first recognition processing unit 112 is not limited to a code symbol. For example, an item with a price reduction sticker attached thereto may also be provided with a flag sticker (or flag symbol) that indicates that the price reduction sticker has been attached. Generally, such a flag sticker has a simple geometric shape, such as a double circle, and is attached near the code symbol on the item. Such a flag sticker is used in the context to prevent a failure to read or otherwise account for the price reduction sticker in the merchandise registration process. The flag sticker is thus placed to be recognized, or at least imaged, at the same time as the code symbol.

The first recognition processing unit 112 may be, for example, configured to recognize the presence of the flag sticker in the same image(s) used to recognize the code symbol. Specifically, when the first recognition processing unit 112 recognizes a code symbol, the first recognition processing unit 112 can also recognize the geometric shape corresponding a flag sticker near the code symbol. When the first recognition processing unit 112 recognizes a flag sticker is present on the item, the first recognition processing unit 112 waits until the result of the recognition of the price reduction sticker is received (returned) from the image processing device 20. Upon receiving the price reduction information (information corresponding to the recognized price reduction sticker), the first recognition processing unit 112 outputs the price reduction information along with the merchandise code to the merchandise sales data processing device or the like. Hereinafter, the images of the code symbol, the flag sticker and the like recognized in the first recognition processing by the first recognition processing unit 112 are referred to as a "trigger image".

The communication control unit 113 transmits the image data from the image pickup unit 16 to the image processing device 20. The communication control unit 113 also receives the result of the recognition of the image data that has been processed by the image processing device 20.

Specifically, the communication control unit 113 transmits a request to send image data acquired by the image pickup control unit 111 to the image processing device 201, which is the primary device in this example.

On receiving a positive response to the request from the image processing device 201, the communication control unit 113 transmits the image data to the image processing device 201. The communication control unit 113 then receives a recognition result from the image processing device 201.

In general, it is preferable that the communication control unit 113 limits the transmission of the image data in order to reduce the load on the image processing device 20. For example, if the image processing device 20 is being used to recognize a price reduction sticker, the communication control unit 113 sends image data only after the first recognition processing unit 112 recognizes the trigger image and continues to transmit image data (e.g., images in time series) for some predetermined maximum period of time (for example, for several seconds) or otherwise until the recognition processing is completed. Thus, the time during which the resources of the image processing device 20 are used can be reduced and therefore a reduction in the load on the image processing device 20 can be achieved.

If a negative response to the request is transmitted from the image processing device 201, the communication control unit 113 does not transmit the image data to the image processing device 201 but rather transmits the image data to the image processing device 202, which is the secondary device.

If the image processing device 20 to be the destination of transmission of image data is designated in the negative response, the communication control unit 113 may transmit the image data to the designated image processing device 20.

Figure 5:
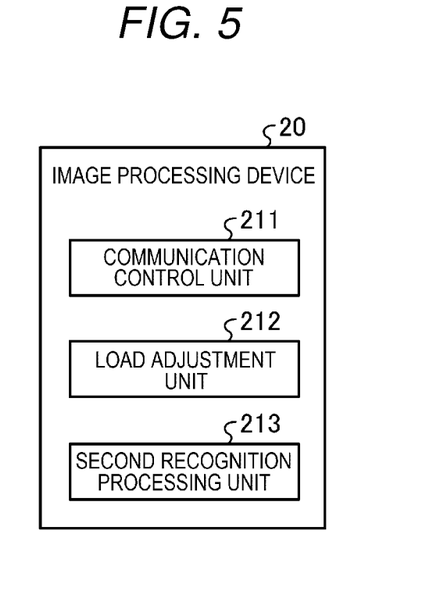
FIG. 5 depicts a functional configuration of an image processing device.

FIG. 5 shows an example of a functional configuration of an image processing device 20. As shown in FIG. 5, the image processing device 20 provides the functions of a communication control unit 211, a load adjustment unit 212, and a second recognition processing unit 213.

These described functional units of the image processing device 20 may be implemented as a software configuration of the CPU 21 (or the like) by execution of the control program 251 (or the like). In some examples, these described functional units may be implemented, in whole or in part, as a hardware configuration such as a dedicated circuit or the like installed in the image processing device 20.

The communication control unit 211 receives image data transmitted from the scanner device 10. The communication control unit 211 also transmits the result of the recognition processing on the image data to the scanner device 10.

The load adjustment unit 212 acquires information indicating a present load (local load) on the image processing device 20 related to the execution of the second recognition processing and adjusts the number of processes in the second recognition processing being executed locally based on the acquired load information. The load information may be any indicator quantitatively or otherwise indicating the present load condition of the image processing device 20 and may be, for example, the CPU utilization value, the number of active threads, the number of individual second recognition processings, the number separate of separate images (or otherwise an amount of image data) queued to be processed in second recognition processing, or the like.

Thus, if the load on the image processing device 20 is below a threshold, the load adjustment unit 212 controls the communication control unit 211 to return a positive response to the request transmitted from the scanner device 10 which then transmits the image data.

If the load on the image processing device 20 is at or above the threshold, the load adjustment unit 212 controls the communication control unit 211 to return a negative response to the request transmitted from the scanner device 10 and thus the scanner device 10 does not transmit new image data to the responding image processing device 20, which causes the scanner device 10 to attempt to transmit image data to another image processing device 20.

The load adjustment unit 212 may be provided in one of the image processing devices 20 such as the image processing device 201, which is the primary device. The load adjustment unit 212 in image processing device 201 may designate the image processing device 202, which is the secondary device, as the destination for image data, via the negative response. In this case, the load adjustment unit 212 may transmit the negative response including the address or the like of the image processing device 202.

The second recognition processing unit 213 executes second recognition processing for recognizing other information about the merchandise beyond the trigger image from the image data from the image pickup unit 16, in cooperation with the image processing unit 26 and the like. The second recognition processing unit 213 also transmits the processing result of the second recognition processing to the scanner device 10.

Specifically, the second recognition processing unit 213 executes processing for recognizing a price reduction sticker from the image data transmitted from the scanner device 10. On recognizing the price reduction sticker in the image data, the second recognition processing unit 213 transmits information such as the amount of price reduction corresponding to the price reduction sticker to the scanner device 10.

In general, the second recognition processing as executed by the second recognition processing unit 213 is assumed to involve a higher load than the first recognition processing as executed by the first recognition processing unit 112 of the scanner device 10. For example, generally, the price reduction sticker is a more complex shape than a code symbol or a flag sticker. Therefore, the load involved in the processing tends to be higher. Also, typically, the code symbol is specifically turned toward the image pickup unit 16 by the customer in such a way that the entirety of the code symbol fits within an acquired image when the item is being scanned. Therefore, the code symbol can usually be easily recognized in an image. In contrast, the price reduction sticker be imaged while the code symbol is being searched for. Therefore, the price reduction sticker may only fleetingly or partially appear in the image data. Thus, for the price reduction sticker recognition, the entirety of a series of image data might have to be processed and the load involved in the recognition processing increases.

In this way, in this embodiment, the scanner device 10 is able to execute the first recognition processing with a relatively low load and relies on an image processing device 20 to execute the higher load second recognition processing when necessary. Thus, the image processing device 20 supports recognition processing for the scanner device 10.

Figure 6:
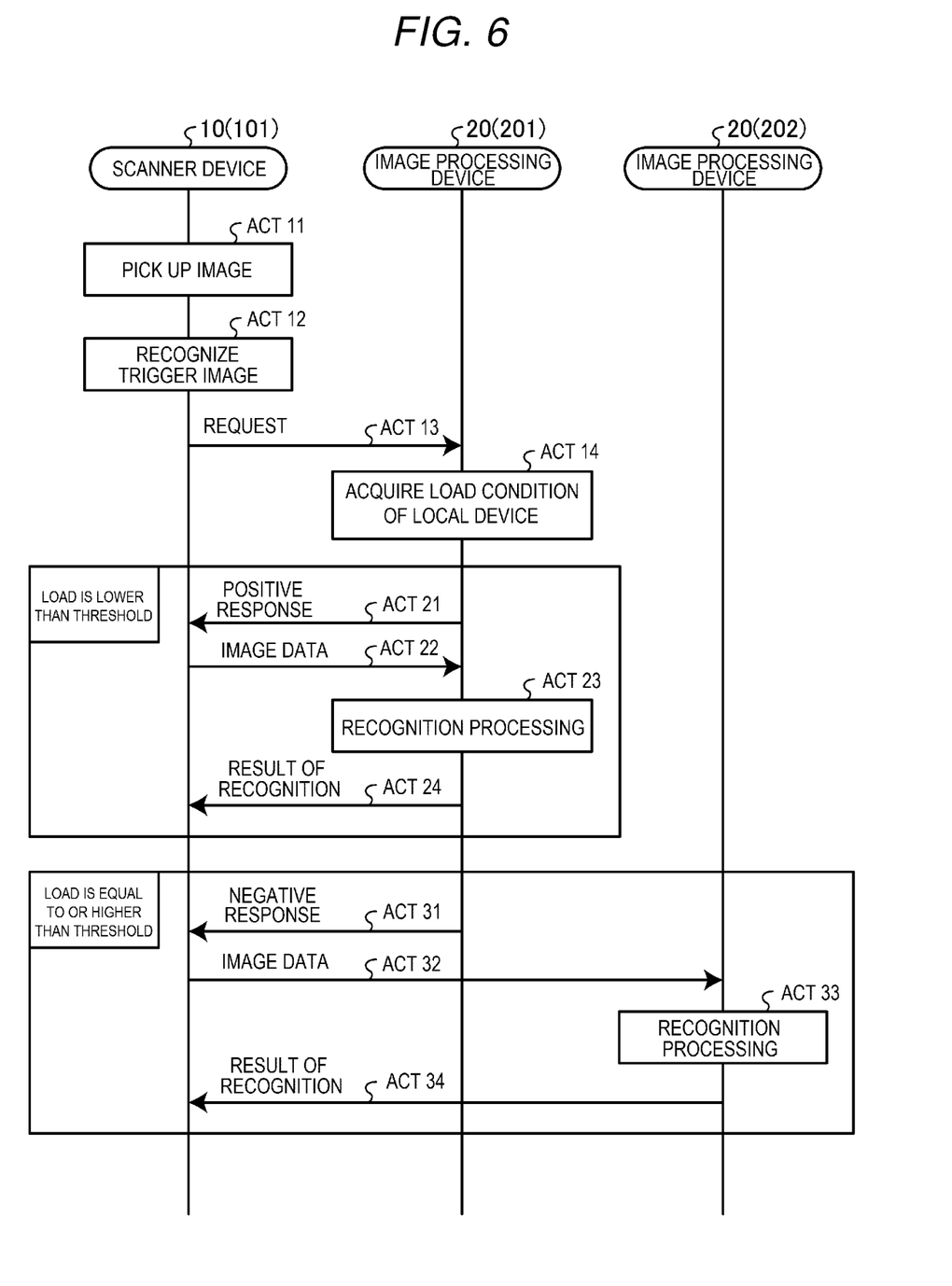
FIG. 6 is a sequence diagram showing an example of processing executed by a scanner device and an image processing device.

An example operation of a scanner device 10 and an image processing device 20 in this embodiment will now be described. FIG. 6 is a sequence diagram showing an example of the processing executed by a scanner device 10 and an image processing device 20 in this example embodiment. In FIG. 6, only the processing of the scanner device 101 is illustrated as representative for other scanner devices 10 (102, 103), which could execute similar operations in other examples.

First, in the scanner device 101, the image pickup unit 16 starts image acquisition ("pick up") under the control of the image pickup control unit 111 (ACT 11). The first recognition processing unit 112 executes the first recognition processing for recognizing a trigger image in the image data from the image pickup unit 16 (ACT 12). When the first recognition processing unit 112 recognizes a trigger image, the communication control unit 113 transmits a request to an image processing device 20 (primary image processing device 201) (ACT 13).

In the image processing device 201, on receiving the request from the scanner device 101, the load adjustment unit 212 acquires the load condition of the local device (that is, the image processing device 201 itself) (ACT 14) and checks whether the local load is lower than a threshold or not.

If the load is lower than the threshold, the load adjustment unit 212 controls the communication control unit 211 to transmit a positive response to the scanner device 101 (ACT 21). On receiving the positive response from the image processing device 201, the communication control unit 113 of the scanner device 101 transmits image data to the image processing device 201 (ACT 22). The second recognition processing unit 213 of the image processing device 201 then executes the second recognition processing for recognizing a price reduction sticker in the image data transmitted from the scanner device 101 (ACT 23). The second recognition processing unit 213 then transmits the result of the second recognition processing to the scanner device 101 (ACT 24).

If the local load is at or above the threshold because, for example, the image processing device 201 is already processing image data transmitted from scanner device 102 and/or scanner device 103 (or for some other reason), the load adjustment unit 212 controls the communication control unit 211 to transmit a negative response to the scanner device 101 (ACT 31). In conjunction with the negative response, the load adjustment unit 212 may notify the scanner device 101 to use the image processing device 202 as the destination for image data transmission.

On receiving the negative response from the image processing device 201, the communication control unit 113 of the scanner device 101 refrains from transmitting image data to the image processing device 201 and instead transmits image data to the image processing device 202, which is the designated secondary device (ACT 32). If the negative response designates another image processing device 20 (e.g., image processing device 202) as the destination for image data transmission, the communication control unit 113 may then transmit image data to the designated image processing device 202.

When image data is output from the scanner device 101 to the image processing device 202, the second recognition processing unit 213 of the image processing device 202 executes second recognition processing on the provided image data (ACT 33). The second recognition processing unit 213 then transmits the second recognition processing results to the scanner device 101 (ACT 34).

In FIG. 6, when the scanner device 101 transmits image data to the image processing device 202 as the secondary device, a separate request (such as sent in ACT 13) is omitted. However, in other examples, the scanner device 110 may transmit a request to the secondary image processing device 202 after receiving of a negative response from the primary image processing device 201 and wait for a positive response from the secondary image processing device 202 before transmitting image data to the secondary image processing device 202.

In a checkout system 1 according to this embodiment, image data from the scanner device 10 after recognizing a trigger image is transmitted to an image processing device 20 for recognition processing for a price reduction sticker. In this way, the image processing device 20 can take partial responsibility for the recognition processing associated with an item of merchandise and therefore can support the recognition processing by the scanner device 10. Also, since it is the image processing device 20 that executes the higher load second recognition processing, the processing load of the scanner device 10 can be prevented from entering a high-load state. Thus, the scanner device 10 can operate more stably and achieve smoother execution of tasks as associated with merchandise registration.

If the load on an image processing device 20 is equal to or higher than a threshold, the image data to be transmitted to another image processing device 20 for performance of second recognition processing. Thus, an individual image processing device 20 can prevent itself from entering a high-load state and therefore can achieve a more stable operation.

Various modifications of the example aspects described above can be made. These modifications described below may be separately implemented or may be suitably combined together.

Modification Example 1

In an embodiment, the image processing devices 20 are divided into a primary device and a secondary device. In other examples, all of the image processing devices 20 may be set as primary devices. In this case, the scanner devices 10 may be configured to transmit a request randomly to one of the plurality of image processing devices 20.

Modification Example 2

In an embodiment, the load adjustment unit 212 is configured to monitor the load condition of just the local device (the receiving image processing device 20). However, in other examples, the load adjustment unit 212 may also monitor the load condition of the other image processing device(s) 20. For example, the load adjustment units 212 provided in each individual image processing device 20 may function to transmit and receive load condition information to and from each other via the network N and thus monitor the load conditions of each available image processing device 20.

In such a modification, when the load on the local device is equal to or higher than the threshold, the load adjustment unit 212 may select another image processing device 20 having a load lower than the threshold. The image processing device 20 presently in the high-load state may then indicates the address of the selected low-load state image processing device 20 to the scanner device 10 via a negative response.

The method of selecting the image processing device 20 for either the initial transmission request or the subsequent destination if the initial destination is in a high-load state when there is a plurality of image processing devices 20 available is not particularly limited. An image processing device 20 in either case may be selected randomly or by a round robin method. In some examples, the image processing device 20 with the lowest present load may be preferentially selected.

Figure 7:
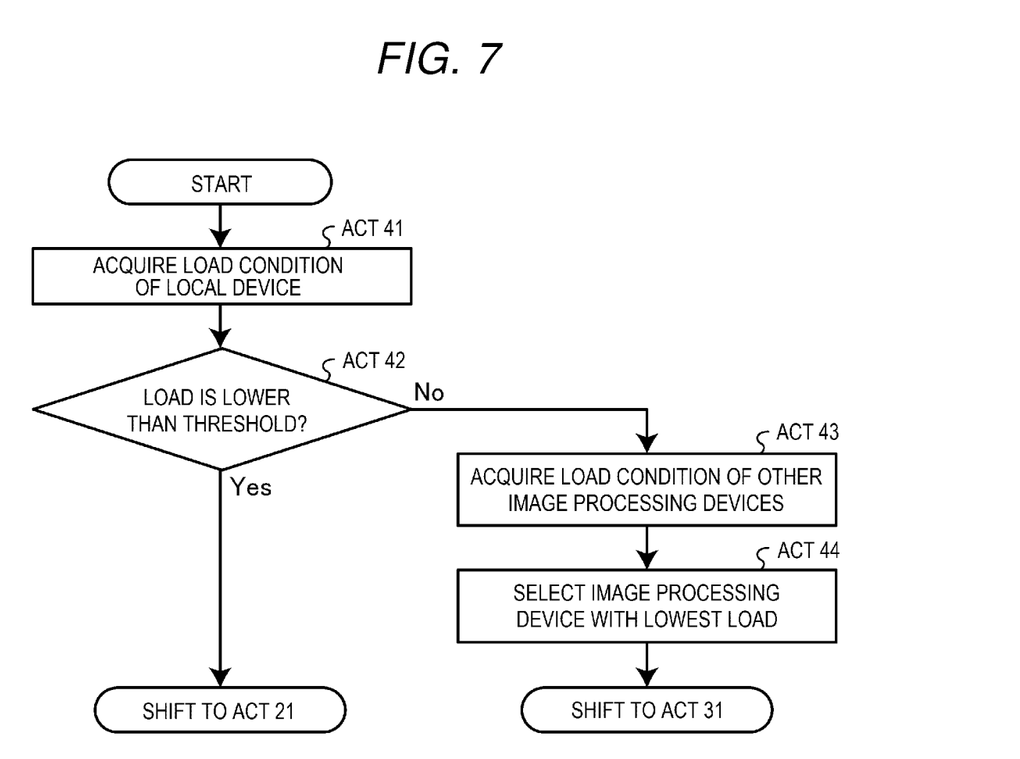
FIG. 7 is a flowchart of processing executed by a load adjustment unit.

FIG. 7 is a flowchart showing an example of the processing executed by the load adjustment unit 212 in this modification example. This processing can be executed in place of the processing of ACT 14 as described with reference to FIG. 6.

First, the load adjustment unit 212 acquires the load condition of the local device (ACT 41). In this context, the "local device" is the particular image processing device 20 associated with the load adjustment unit performing the present processing. The load adjustment unit 212 then determines whether the local load is lower than a threshold or not (ACT 42). If the local load is lower than the threshold (Yes in ACT 42), the load adjustment unit 212 shifts to the processing associated with ACT 21 in FIG. 6.

However, if the load on the local device is equal to or higher than the threshold (No in ACT 42), the load adjustment unit 212 acquires the load condition of the other image processing devices 20 (ACT 43). The load adjustment unit 212 then selects one image processing device 20 from the other image processing devices 20 that has a present load that is lower than the threshold or is the lowest from among the available image processing devices 20 (ACT 44).

The load adjustment unit 212 then shifts to the processing associated with ACT 31 in FIG. 6 and transmits the address of the image processing device 20 that was selected in ACT 44 to the scanner device 10 via a negative response or the like.

The image processing device 20 according to this modification example selects an image processing device 20 to be the destination for image data based on the load conditions of the image processing devices 20 whenever the load on the local device is equal to or higher than the threshold. Thus, the image processing device 20 according to this modification example can execute the second recognition processing in consideration of not only the load on itself (local load) but also the load on all the other image processing devices 20 and therefore can achieve more stable operations of all the image processing devices 20.

The load adjustment unit 212 is configured to select one image processing device 20 from among the other image processing devices 20 if the load on the local device is equal to or higher than the threshold. However, the load adjustment unit 212 may also be configured in other examples to select the image processing device 20 with the lowest load from among all the image processing devices 20 including the local device.

Modification Example 3

In an embodiment, the image processing device 20 recognizes a price reduction sticker attached to an item of merchandise. However, the object to be recognized by the image processing device 20 is not limited to this. For example, the second recognition processing unit 213 of the image processing device 20 may execute second recognition processing for extracting feature data related to the appearance of item in image data and then recognizing (identifying) the item (object) in the image based on the extracted feature data rather than a code symbol reading or the like. In this case, the second recognition processing can incorporate object recognition technologies often referred to as generic object recognition, deep learning models, or the like. Also, if an item is to be recognized (identified) by the second recognition processing, the scanner device 10 may be configured not to execute the first recognition processing.

The programs executed by each device in the above embodiments can be stored in a ROM, a memory unit or the like in advance and provided to an end user in this form. The programs executed by each device in the above embodiments may be recorded as a file in an installable format or an executable format in a non-transitory, computer-readable recording medium such as a CD-ROM, flexible disk (FD), CD-R, or DVD (digital versatile disk) and provided in this form.

The programs executed by each device in the above embodiments may be stored on a computer connected to a network such as the internet and downloaded, accessed, or otherwise provided via such a network.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An information processing device for retail merchandise registration systems, the device comprising:
    a communication interface configured to connect to a plurality of scanner devices and receive a processing request and image data from a scanner device in the plurality of scanner devices;
    an image processing unit configured to perform recognition processing on the image data from the scanner device to detect an object depicted in the image data; and
    a processor configured to:
        upon the processing request being received via the communication interface, compare a present local device load value to a threshold load value,
        send, via the communication interface, a positive response to the processing request when the present local device load value is less than the threshold load value and a negative response when the present local device load value is equal to or greater than the threshold load value,
        receive, via the communication interface, the image data only after sending the positive response,
        provide the received image data to the image processing unit for the recognition processing, and
        send a recognition result to the scanner device via the communication interface after the recognition processing is performed by the image processing unit.

2. The information processing device according to claim 1, wherein the present local device load value is acquired by the processor from the image processing unit.

3. The information processing device according to claim 1, wherein the processor is further configured to send, via the communication interface, an address of another information processing device to the scanner device if the present local device load value is equal to or greater than the threshold load value.

4. The information processing device according to claim 3, wherein the address is included in the negative response.

5. The information processing device according to claim 1, wherein the object depicted in the image data is a price reduction sticker affixed to an item of merchandise.

6. The information processing device according to claim 1, wherein the object depicted in the image data is an item of merchandise being registered in a sales transaction.

7. The information processing device according to claim 1, wherein the image processing unit is a graphics processing unit.

8. The information processing device according to claim 1, wherein the image processing unit is implemented by the processor.

9. The information processing device according to claim 1, wherein the processor is further configured to acquire a device load value from another information processing device via the communication interface.

10. A merchandise registration system, comprising:
    a plurality of product scanner devices for registering merchandise in a sales transaction; and
    an information processing device including:
        a communication interface configured to connect to the plurality of product scanner devices and receive a processing request and image data from a product scanner device in the plurality of product scanner devices;
        an image processing unit configured to perform recognition processing on the image data from the product scanner device to detect an object depicted in the image data; and
        a processor configured to:
            upon the processing request being received via the communication interface, compare a present local device load value to a threshold load value,
            send, via the communication interface, a positive response to the processing request when the present local device load value is less than the threshold load value and a negative response when the present local device load value is equal to or greater than the threshold load value,
            receive, via the communication interface, the image data only after sending the positive response,
            provide the received image data to the image processing unit for the recognition processing, and
            send a recognition result to the scanner device via the communication interface after the recognition processing is performed by the image processing unit.

11. The merchandise registration system according to claim 10, wherein the present local device load value is acquired by the processor from the image processing unit.

12. The merchandise registration system according to claim 10, wherein the processor is further configured to send, via the communication interface, an address of another information processing device in the merchandise registration system to the scanner device if the present local device load value is equal to or greater than the threshold load value.

13. The merchandise registration system according to claim 12, wherein the address is included in the negative response.

14. The merchandise registration system according to claim 10, wherein the object depicted in the image data is a price reduction sticker affixed to an item of merchandise.

15. The merchandise registration system according to claim 10, wherein the object depicted in the image data is an item of merchandise being registered in a sales transaction.

16. The merchandise registration system according to claim 10, wherein the image processing unit is a graphics processing unit.

17. The merchandise registration system according to claim 10, wherein the image processing unit is implemented by the processor.

18. The merchandise registration system according to claim 10, wherein the processor is further configured to acquire a device load value from another information processing device via the communication interface.

19. A merchandise registration system, comprising:
a plurality of product scanner devices for registering merchandise in a sales transaction; and
a plurality of information processing devices, each including:
a communication interface configured to connect to the plurality of product scanner devices and receive a processing request and image data from a product scanner device in the plurality of product scanner devices;
an image processing unit configured to perform recognition processing on the image data from the product scanner device to detect an object depicted in the image data; and
a processor configured to:
upon the processing request being received via the communication interface, compare a present local device load value to a threshold load value,
send, via the communication interface, a positive response to the processing request when the present local device load value is less than the threshold load value and a negative response when the present local device load value is equal to or greater than the threshold load value,
receive, via the communication interface, the image data only after sending the positive response,
provide the received image data to the image processing unit for recognition processing, and
send a recognition result to the scanner device via the communication interface after the recognition processing is performed by the image processing unit.

20. The merchandise registration system according to claim 19, wherein the processor of each information processing device is further configured to send, via the communication interface, an address of another information processing device in the merchandise registration system to the product scanner device if the present local device load value is equal to or greater than the threshold load value.

* * * * *